(12) United States Patent
Smith et al.

(10) Patent No.: US 7,729,076 B2
(45) Date of Patent: Jun. 1, 2010

(54) ANGULARLY SPACED SPIRAL ERASE FOR MEDIA

(75) Inventors: Craig Smith, Santa Clara, CA (US); Brian Rigney, Louisville, CO (US); Todd Franks, Berthoud, CO (US); Xin H. Yang, Fremont, CA (US); Stan Shepherd, Morgan Hill, CA (US); Bruce Liikanen, Berthoud, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 335 days.

(21) Appl. No.: 11/750,918

(22) Filed: May 18, 2007

(65) Prior Publication Data

US 2007/0268619 A1 Nov. 22, 2007

Related U.S. Application Data

(60) Provisional application No. 60/747,885, filed on May 22, 2006.

(51) Int. Cl.
*G11B 5/03* (2006.01)

(52) U.S. Cl. .......................... 360/66; 360/78.04; 360/46

(58) Field of Classification Search ....................... None
See application file for complete search history.

(56) References Cited

U.S. PATENT DOCUMENTS

| 5,668,679 | A  | * | 9/1997  | Swearingen et al. | 360/75 |
|-----------|----|---|---------|-------------------|--------|
| 6,507,450 | B1 | * | 1/2003  | Elliott           | 360/77.08 |
| 7,123,435 | B1 |   | 10/2006 | Schreck           |        |
| 7,133,233 | B1 | * | 11/2006 | Ray et al.        | 360/67 |
| 7,460,324 | B2 | * | 12/2008 | Ohinata et al.    | 360/66 |
| 7,529,055 | B1 | * | 5/2009  | Laks et al.       | 360/75 |
| 2004/0075936 | A1 | * | 4/2004 | Lee             | 360/78.04 |
| 2007/0291401 | A1 | * | 12/2007 | Sun et al.     | 360/75 |

* cited by examiner

*Primary Examiner*—Jason C Olson
(74) *Attorney, Agent, or Firm*—David K. Lucente

(57) ABSTRACT

Embodiments of the present invention allow for media erasure. Various embodiments allow for controlling an actuator based on feedback signal measurements and disk phase to seek a head across a surface of a disk systematically for an erasure operation. Also, in various embodiments, a substantially repeatable seek motion of a head across a stroke may be determined, and launch points at which the head is launched over a disk in the seek motion for erasing at least a portion of the disk are determined based on disk phase.

20 Claims, 5 Drawing Sheets

ANGULARLY SPACED SPIRAL ERASE FOR MEDIA

CROSS-REFERENCE TO RELATED PATENT APPLICATIONS

Embodiments of the present invention relate to U.S. Provisional Application Ser. No. 60/747,885, filed May 22, 2006, entitled "In-Drive Media Erase Using Spiral Motions", the contents of which are incorporated by reference herein and which is a basis for a claim for priority.

BACKGROUND

Embodiments of the present invention relate to erasing a storage medium and, in particular embodiments, to erasing a disk surface.

There are several methods utilized in the related art to achieve erasure of media. A bulk erase is a common, but inconvenient process. In a bulk erase, the media is removed from a drive and erased. The drive is then reassembled. This necessitates making mechanical changes to the drive.

Another method in the related art is a servo-track-writer erase. The servo-track-writer writes servo information, which includes identification information and burst patterns on a magnetic disk. The servo-track-writer writes this information onto the magnetic disk in part by pressing a pushpin against an actuator on which a magnetic head is mounted. This necessarily involves uncovering the hard disk drive and, thus, requires that the servo information write must be performed in a clean room. The servo-track-writer erase also involves utilizing the pushpin to control the write head of the drive, which again consequently requires the use of a clean room, along with the aforementioned inconvenience of making mechanical changes to the drive. Further, the use of a servo-track-writer involves an addition of machinery to the drive that is costly.

A third method in the related art is a random windshield wiper erase, which involves random motions of a voice coil motor with DC erase current. Because the motions are random, there is no guarantee that all of the media is erased; rather an amount of the media that is erased depends upon an ability to correct for errors; The major disadvantage of this method is head degradation associated with the write current at the head during a seek across a textured landing zone boundary. For ramp load/unload designs, the use of write current through the head when the head hits the ramp impacts an effectiveness and lifetime of the head. It is important to turn off the write current through the head as the head is hitting and moving up to the ramp. This is because there is a potential for head failure and thermal damage to the head if the head is writing without an air bearing between the head and the disk surface. Thus, there may be problems with using random motions for erase with ramp load/unload products.

A fourth method in the related art is an in-drive bulk DC erase. This method also necessitates mechanical changes to the drive.

Further, with regard to ex-situ multidisk writers, it could be advantageous to efficiently erase a disk without having to remove it from an ex-situ multidisk writer, particularly with writers that are able to do verification on the servo patterns that are written. For example, if a spindle of 10 to 15 disks were written, and a large number of those failed servo verification, it might be advantageous to erase each of the failed disks and be able to write them again without having to unload them to a bulk eraser.

SUMMARY

Embodiments of the present invention allow for media erasure. Various embodiments allow for controlling an actuator based on feedback signal measurements and disk phase to seek a head across a surface of a disk systematically for an erasure operation. Also, in various embodiments, a substantially repeatable seek motion of a head across a stroke may be determined, and launch points at which the head is launched over a disk in the seek motion for erasing at least a portion of the disk are determined based on disk phase.

A method in accordance with an embodiment of the present invention includes controlling an actuator to seek a head across a surface of a disk systematically in a plurality of passes based on feedback signal measurements and disk phase. The method may further include providing an erase write pattern to the head for each of the plurality of passes of the head across the surface of the disk. In some embodiments, the feedback signal measurements include back electromagnetic field measurements of an actuator, or the like. Also, in some embodiments, the disk phase is determined based on zero crossings of a spindle motor that spins the disk.

An apparatus in accordance with an embodiment of the present invention includes a first controller for controlling an actuator to seek a head across a surface of a disk systematically in a plurality of passes based on feedback signal measurements and disk phase. The apparatus may further include a second controller for providing an erase write pattern to the head for each of the plurality of passes of the head across the surface of the disk.

A method in accordance with an embodiment of the present invention includes determining a substantially repeatable seek motion of a head from an inner diameter of a disk to an outer diameter of the disk, determining a launch point at which the head is launched over the disk based on disk phase, launching the head at the launch point in the seek motion from the inner diameter of the disk to the outer diameter of the disk, and selectively turning on and off a write current to the head during the seek motion to erase at least a portion of the disk.

A method in accordance with an embodiment of the present invention allows for erasing media, the method including controlling an actuator to seek across a disk surface systematically by synchronizing feedback signal measurements with disk phase, and providing an erase write pattern to a write head for each of a plurality of spiral passes across the disk surface.

Other features, embodiments, and advantages of the present invention will be apparent from the following specification taken in conjunction with the following drawings.

DETAILED DESCRIPTION OF PREFERRED EMBODIMENTS

Reference will now be made to the accompanying drawings, which assist in illustrating various pertinent features of embodiments of the present invention. Although embodiments of the present invention will now be described primarily in conjunction with disk drives, it should be expressly understood that embodiments of the present invention may be applicable to other applications where magnetic recording of data is required or desired. In this regard, the following description of a disk drive is presented for purposes of illustration and description.

Figure 1:
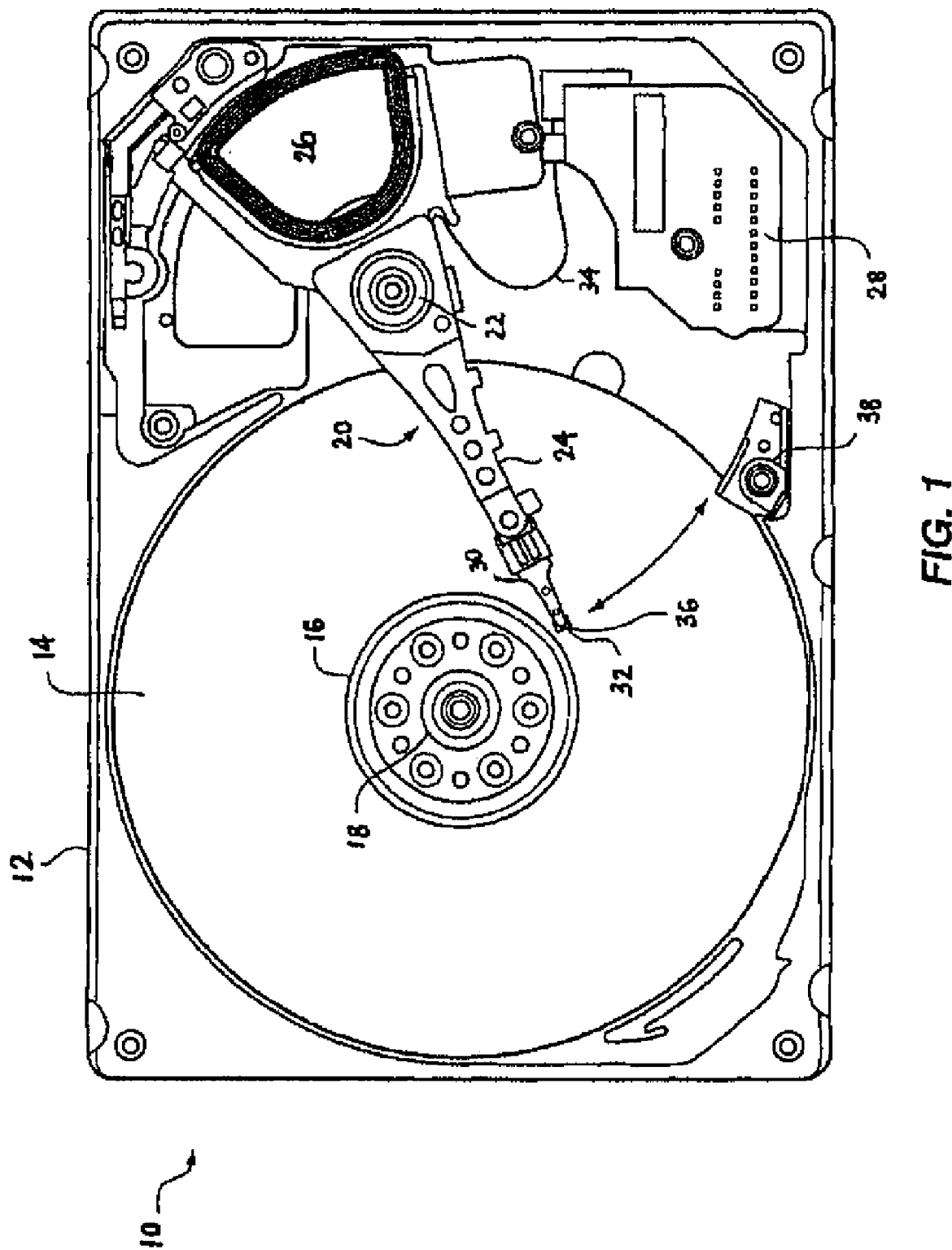
FIG. 1 illustrates a functional block diagram of a disk drive in accordance with an embodiment of the present invention.

FIG. 1 illustrates a disk drive 10 with one or more storage disks 14 that may be erased in accordance with an embodiment of the present invention. The disk drive 10 generally includes a base plate 12 and a cover (not shown) that may be disposed on the base plate 12 to define an enclosed housing or space for various disk drive components. The disk drive 10 includes the one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips, or the like, that cantilever from a common structure. In any case, movement of the actuator arm assembly 20 is provided by an actuator arm drive assembly 26 or actuator 26, such as a voice coil motor, or the like. The actuator 26 may be a magnetic assembly that controls the operation of the actuator arm assembly 20 under a direction of control electronics 28.

The actuator arm assembly 20 may further include one or more load beam(s) or suspension(s) 30, where each suspension 30 may be attached to the free end of a respective actuator arm 24 and cantilever therefrom. Typically, the suspension 30 is biased generally toward its corresponding disk 14 by a spring-like force. A slider 32 is disposed at or near the free end of each suspension 30. The biasing forces exerted by the suspension 30 on its corresponding slider 32 thereby attempt to move the slider 32 in the direction of its corresponding disk 14. Typically, this biasing force is such that if the slider 32 were positioned over the corresponding disk 14 without the disk 14 being rotated at a sufficient velocity, the slider 32 would be in contact with the disk 14. The disk drive 10 includes a transducer or head 36 as part of the slider 32 for reading data from and/or writing data to a surface of the disk 14.

The head 36 on the slider 32 is interconnected with the control electronics 28 of the disk drive 10 by a flex cable 34 that is typically mounted on the actuator arm assembly 20. Signals may be exchanged between the head 36 and its corresponding data storage disk 14 for disk drive read/write operations. In this regard, the actuator 26 is utilized to pivot the actuator arm assembly 20 to simultaneously move the slider 32 along a path and across the corresponding data storage disk 14 to position the head 36 at a desired or required radial position on the disk 14 (i.e., at an approximate location of a desired track on the data storage disk 14) for disk drive read/write operations.

When the disk drive 10 is not in operation, the actuator arm assembly 20 may be pivoted to a parked position to dispose each slider 32 generally at or beyond a perimeter of its corresponding data storage disk 14, but in any case is vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired parking function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or landing on the corresponding data storage disk 14, and the slider 32 would remain on the disk 14 until disk drive operations were re-initiated.

The slider 32 of the disk drive 10 may be configured to "fly" on an air bearing during rotation of its corresponding data storage disk 14 at a sufficient velocity. The slider 32 may be disposed at a pitch angle such that its leading edge is disposed further from its corresponding data storage disk 14 than its trailing edge. The head 36 would typically be incorporated on the slider 32 generally toward its trailing edge since this edge may be positioned closest to its corresponding disk 14. Other pitch angles and orientations could also be utilized for flying the slider 32.

The random windshield wiper erase method has a similar setup and operation as described above. One distinction, among many, between the instant invention and the random windshield wiper erase method is regarding a motion of the actuator 26. Specifically, in embodiments of the present invention, the motion of the actuator 26 back and forth across the disk is under closed-loop control for erase operations, rather than "random" control, as in the random windshield wiper erase method. In the random windshield wiper erase method, the head is moved across the surface with a write current applied, and the motion of the actuator 26 is under a random open loop signal, which has the actuator arm 24 sweep the head 36 randomly back and forth across a stroke. The random windshield wiper erase method has a high probability of moving the head 36 over all of the area of the disk 14, with write current applied. However, there is no guarantee that the entire surface area of the disk 14 has been erased.

An even more serious problem with the random windshield wiper erase method, as detailed above, is likely damage to the head 36. This damage occurs in several ways. When the head 36 is flying over the disk 14, air around the disk 14 provides a cooling effect. If the write current is on when the head 36 is moving up the ramp assembly 38, there is a loss of ability to dissipate thermal energy to the head 36 while writing, which results in a risk of the head 36 burning up. The head 36 also gets damaged upon contact with the disk 14, when moving over mechanical stops, such as crashstops, textured landing zones, ramps, or the like.

Embodiments of the present invention provide an ability to avoid applying a write current to the head 36 when the head 36 is not flying over the disk 14, by knowing a radial position of the head 36 to within a tolerable accuracy. This greatly reduces a risk damaging the head 36, and also allows for ensuring that the head 36 is passed over every portion of the surface of the disk 14, in contrast to the random windshield wiper erase method, which might not pass over some portions of the media surface due to its random movements during erase.

Embodiments of the present invention allow for controlling a radial position of the head 36 over a known angular position of the rotating disk 14. Specifically, in various embodiments, a control of the actuator 26 with feedback signals such as back electromagnetic field measurements is synchronized with disk phase to seek across the disk 14 systematically to enable the head 36 to pass over every portion of the surface of the disk 14. As mentioned above, embodiments of the present invention utilize spiral motions to erase data on the surface of the disk 14. Such spiral motions result by applying current to the head 36 as described above while the disk 14 is spinning.

In some embodiments, the present invention could be utilized for an in-drive disk erase. In this situation, the actuator 26 would be a voice coil motor. In other embodiments, the present invention could be utilized in a multidisk ex-situ writer. In further embodiments, the present invention could be utilized in a pack write servo, track writer. The media erasure of embodiments of the present invention is not limited to use in one type of drive or writer. Rather, it is applicable and adaptable to numerous different environments.

An embodiment of the present invention can be delineated and separated into four parts. A first part relates to seeking the head 36 from one end of a stroke of the actuator arm assembly 20 to another end of the stroke of the actuator arm assembly 20. A second part involves launching the head 36 for writing operations at specified disk phases during an erasure operation. A third part regards sending an appropriate write pattern to the write head 36. A fourth part is directed to analysis for ensuring a certainty of a complete erase of the disk 14.

With regard to the first part, a start of a seeking motion is determined by resting against a crashstop or the edge of the ramp assembly 38. In the instant invention, the motion is accomplished by an acceleration pulse followed by position control based upon an integrated actuator velocity as measured by the back electromagnetic field of the actuator 26. The size of the acceleration pulse, and the back electromagnetic field scaling to actuator velocity, are characterized on a drive by drive basis and are continually adjusted such that the motion from one crashstop to the other nominally occurs in a targeted amount of time.

Figure 3:
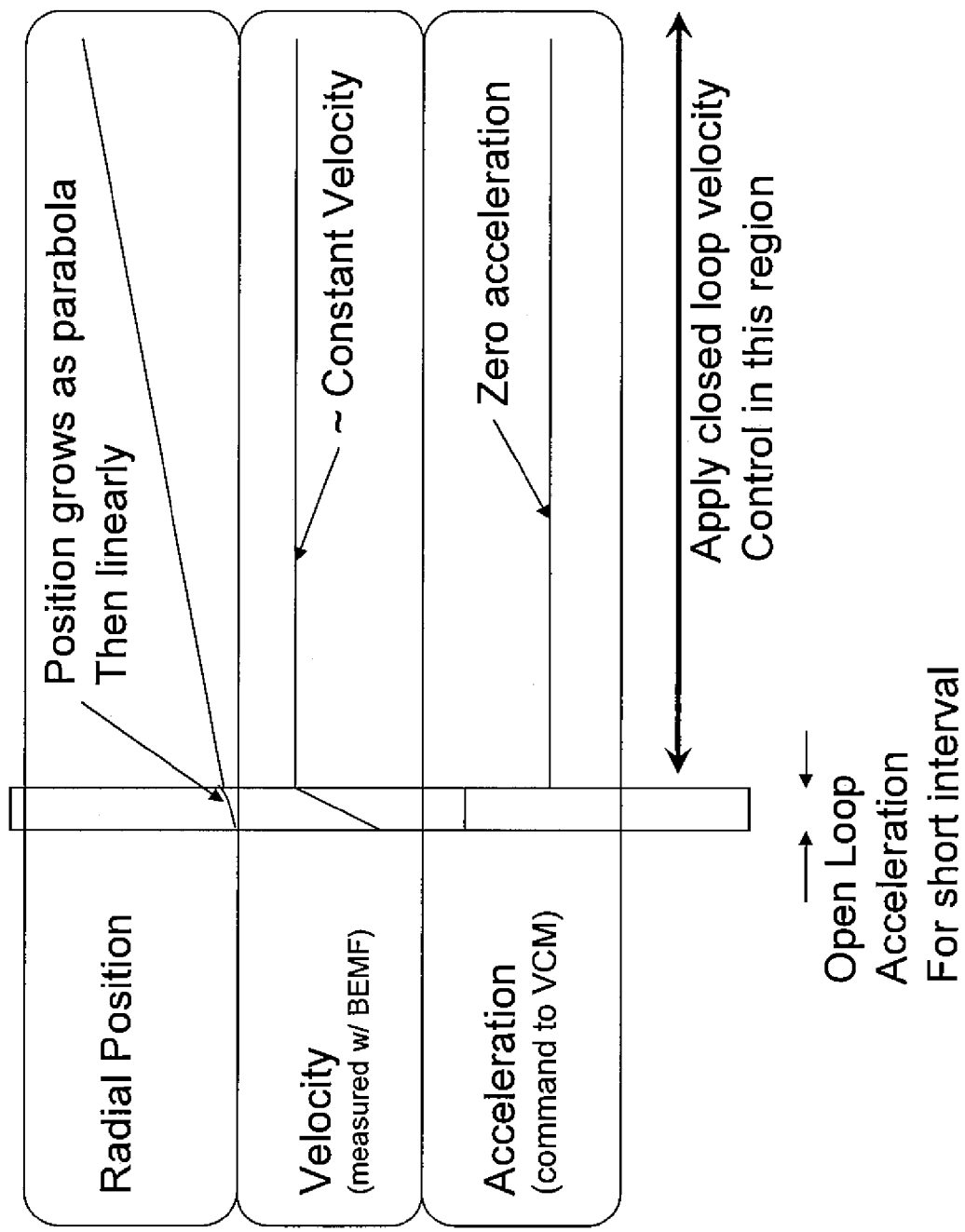
FIG. 3 illustrates a radial profile of motion of a head across a stroke in accordance with an embodiment of the present invention.

Specifically, with the back electromagnetic field sensing circuitry, it can be problematic to apply large or quickly changing currents and measure the back electromagnetic field of the actuator 26. Thus, in order to reach a constant velocity of the motion of the actuator arm assembly 20, an acceleration pulse, or open loop pulse, is applied. Referring now to FIGS. 1 and 3, with the acceleration pulse, the radial position of the head 36 grows as a parabola, with the velocity increasing as well. After applying this larger current, once it is estimated that the necessary velocity is reached, the learned normal current is applied in a closed loop as mentioned above. In this case, the radial position of the head 36 changes linearly, the velocity remains constant, and there is no acceleration. Practically, for about $1/100$ of a disk revolution, the acceleration pulse is applied before the current necessary for a constant velocity is applied.

As mentioned above, this adjustment occurs continuously, but there will be an initial calibration phase of motions during which no writing will occur. This will prevent having write current to the head 36 when the head 36 is not suitably flying over the disk. The calibration phase allows for the estimation of how much acceleration and velocity with which to move the actuator arm assembly 20. In calibrating the movement of the head 36, there are several limitations to keep in mind. There are mechanical hard limits to how much the actuator arm assembly 20 can rotate, typically rotating at a 30 to 35 degree angle on the ramp drive. The angle of the head 36 over the disk 14 varies usually between 22 to 26 degrees. There are also hard limits that prevent the head 36 from contacting spindle clamps of the spindle 16 connected to the disk 14.

Calibration begins with moving the head 36 to a farthest reach toward an inner diameter of the disk 14. Current is applied to have a constant bias against a crashstop in order to obtain a repeatable radial launch point for the spiral seek. An open loop command of acceleration is applied, followed by a bias to keep the velocity constant. The back electromagnetic field is monitored, then the process is repeated, and identification of when the head 36 hits a mechanical stop (like a ramp or crashstop) can be made accordingly.

The back electromagnetic field and velocity is estimated through this process. Associated with the actuator arm assembly 20 is a coil. Because the coil is moving through a magnetic field, voltage is produced. The voltage across the coil can be measured. This value can be utilized to deduce how much of the voltage is due to the back electromagnetic field. Specifically, by subtracting out an expected voltage drop, given the amount of current being applied to move the actuator arm assembly 20, the back electromagnetic field voltage can be estimated. Ideally, the back electromagnetic field value is directly proportional to a velocity of the actuator arm assembly 20. Thus) obtaining the value of the back electromagnetic field voltage also provides an estimate of a value of the velocity of the actuator arm assembly 20.

An edge of a crashstop or ramp assembly 38 may be detected using the back electromagnetic field of the actuator 26. At sufficiently low velocities and commanded current, the suspension 30 will bounce on the edge of the ramp assembly 38 rather than unload the head 36. The detection of the edge of the crashstop or ramp assembly 38 is needed for several reasons. First, this detection establishes a repeatable radial launch point for spiral seeks during erasure operations. Second, this detection allows for establishing a position profile across the stroke. After reaching an end of the stroke, a bias force is applied to bring the suspension 30 to rest against the crashstop or ramp assembly 38. This is followed by a seek across the stroke in the opposite direction.

Embodiments of the present invention utilize repetitive seeks across a stroke of the actuator arm assembly 20 between an outer diameter crashstop (or ramp assembly) at an outer diameter of the disk 14 and an inner diameter crashstop (or ramp assembly) at an inner diameter of the disk 14. Statistically, a radial position of the head 36 during nominally identical seeks is not repeatable. Experimental evidence suggests that repeated seeks will be normally distributed around an average seek. The width of the distribution is most strongly correlated to the time since the spiral was launched. This is the time since an "absolute" position was attained by bias force against the crashstop or ramp assembly. Since there exists a required accuracy to the positioning of the head 36 in order to prevent head damage, a lower bound on the seek velocity is imposed. An actual value of the seek velocity is dependent upon the particulars of the mechanisms involved in the disk drive 10. The targeted seek velocity thus becomes a design variable.

Figure 2:
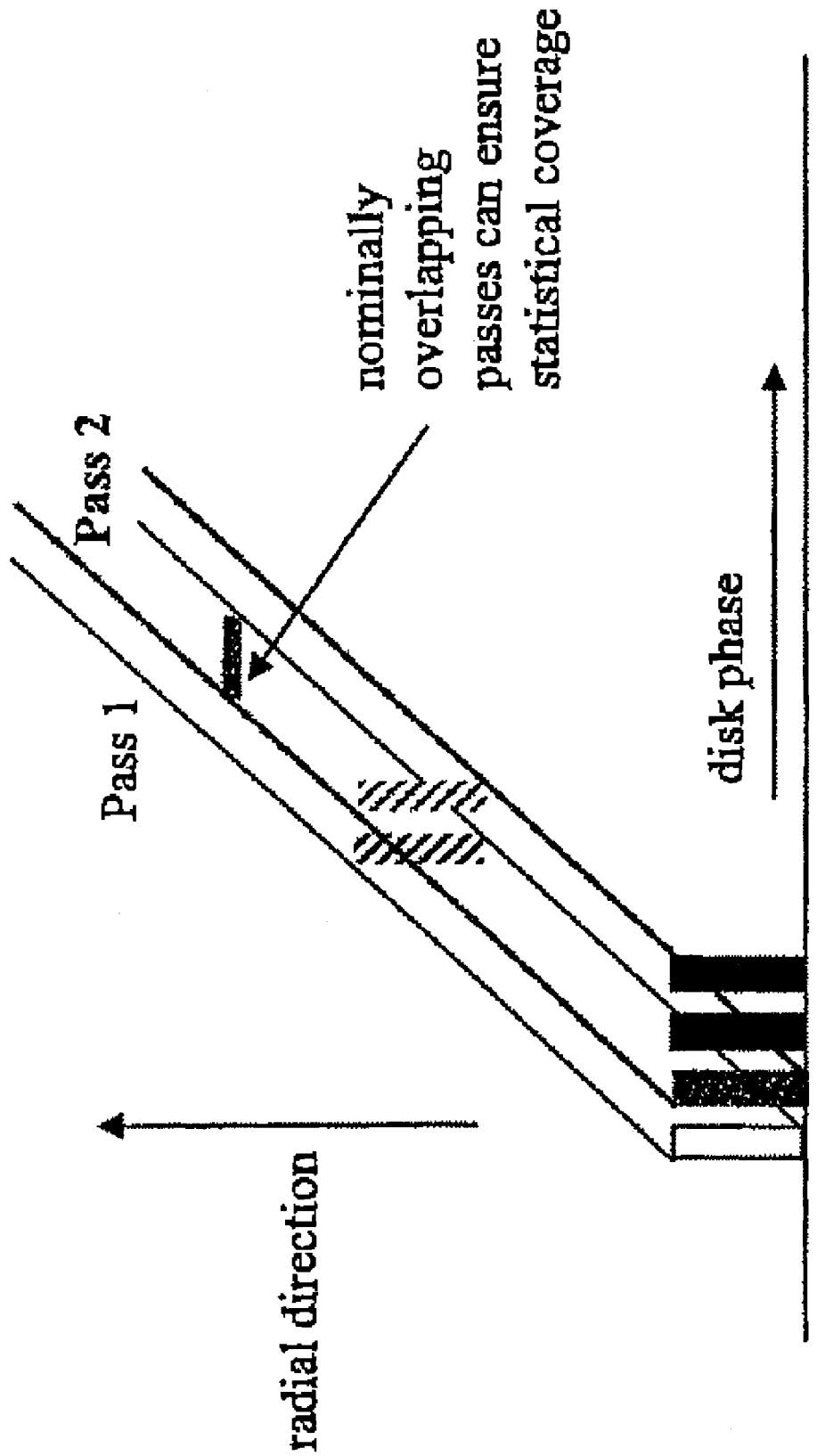
FIG. 2 illustrates spiral launch points of a write head according to an embodiment of the present invention.

A second part of the invention involves launching at a specified disk phase. This is important to guarantee that the head 36 passes over all of the surface of the disk 14. This entails controlling a profile of a seek and a phase at which the seek starts. By utilizing this control, an ability is enabled to distribute a path of a write in phase as multiple seek motions are performed that nominally overlap. FIG. 2 details an angular spacing of launch points in accordance with an embodiment of the present invention. The spiral launch points shift in disk phase, but maintain a same radial position. As is seen by the illustration of FIG. 2, and with reference to FIG. 1, nominally overlapping passes can ensure statistical coverage of the head 36 over the disk 14, ensuring that the head 36 passes over all of the surface of the disk 14. Such angular spacing of launch points is also a design variable.

Zero crossings of a back-electromotive-force from rotation of the spindle motor 18 (not to be confused with back electromagnetic field signals from movement of the actuator 26), and a disk locked clock, are utilized to obtain spiral launch points for erasure operations on the disk 14. In various embodiments, the spindle motor 18 has zero crossing detecting technology. Spindle zero points may be associated with an electromechanical transducer. A first phase is with an undriven coil, which results in a phenomenon similar to induced voltage across a tap. At some other phase, the undriven coil with induced voltage is lined with a magnetic field so that there is no field to produce voltage. That point is the zero crossing. In the case of the spindle motor 18, a magnetic field strength depends upon a position of the motor. Voltage is produced on a coil, such that the undriven coil transitions like a line through some regime. A center tap voltage is used to obtain the zero crossings.

In various embodiments, a disk locked clock uses the spindle zero crossings to drive an estimator of disk phase. Initially, an estimate of a large enough current to get across a stroke with a disk locked clock is utilized, to find out how much phase has expired and a obtain the distance traveled across the stroke based upon a geometry of the disk 14. It allows for a calculation of how many counts of back electromagnetic field correspond to counts of velocity, e.g. % stroke/radian or rotation or revolution. A target can be set for a control loop for a certain velocity in terms of back electromagnetic field counts. The control can be PID (proportional, integrated, derivative), based upon the reference back electromagnetic field value and error from the target. The values are fed forward with nominal trajectory. Utilizing zero crossings and an amount of rotation of the disk 14 between a launch of a stroke and hitting a mechanical stop as a stopwatch to see how long the motion took, a measure of average velocity across the stroke can be obtained. This value can be utilized for a next iteration to update the velocity reference, so that the process is constantly learning and updating.

In various embodiments, this control loop utilizes an integral of the back electromagnetic field value from the actuator 26 to estimate a position of the head 36 with respect to the disk 14. By knowing the position of the head 36, a write current can be turned on and off to avoid damaging the head 36. The integrated back electromagnetic field can be a good indicator of the position of the stroke. In various embodiments, if there are large errors in back electromagnetic field, the current to the head 36 will not be turned on. Also, in various embodiments, the integral of the back electromagnetic field, in part, at least, determines whether or not to turn on the write current to the head 36. In some embodiments, the values of the back electromagnetic field are summed, with the assumption that the sampling rate of the back electromagnetic field is normalized. The velocity error may be determined by measuring a difference of a reference back electromagnetic field value with the measured back electromagnetic field value.

Figure 4:
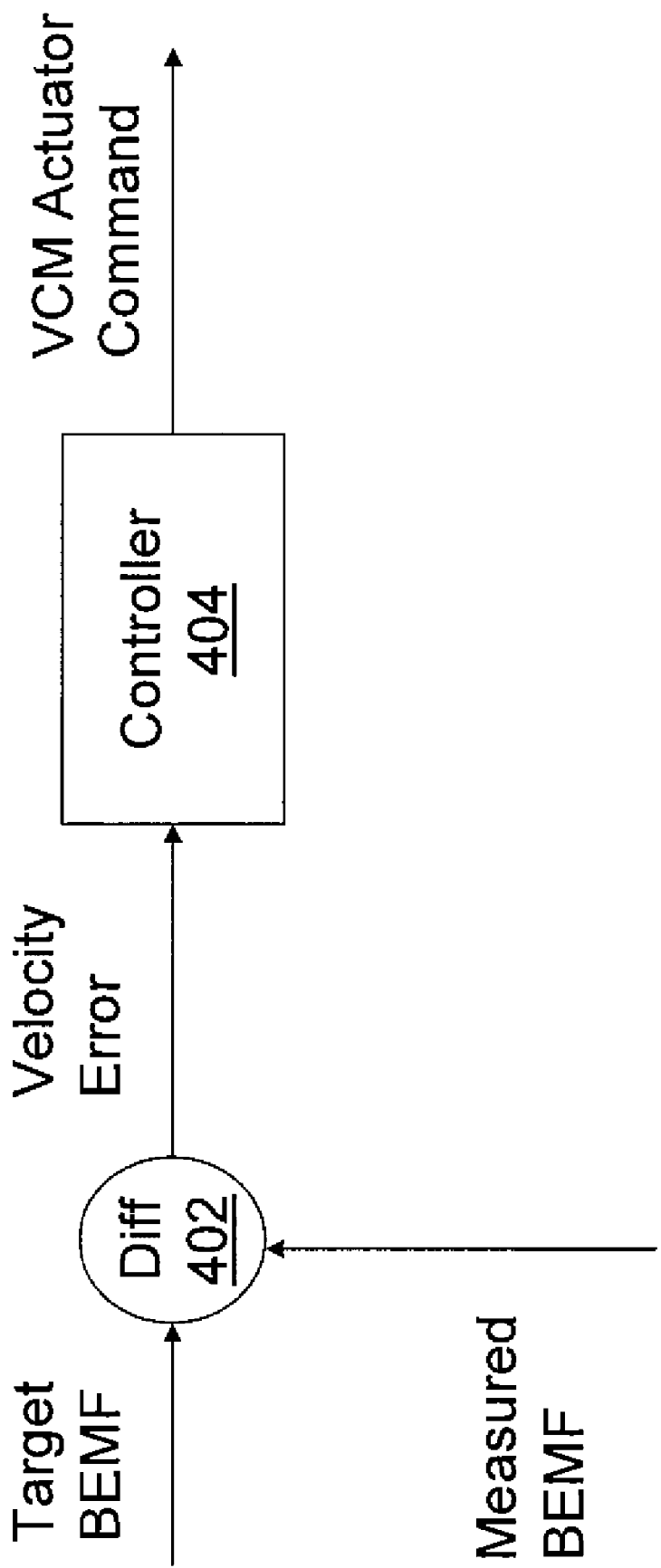
FIG. 4 illustrates a control loop for updating velocity according to an embodiment of the present invention.

Referring to FIGS. 1 and 4, in various embodiments, a control loop provided by the control electronics 28 is configured as follows. A reference or target back electromagnetic field value and a measured back electromagnetic field value are input into a difference calculator 402. The difference calculator 402 calculates a velocity error, and the velocity error is input into a controller 404. The controller 404 is configured to build an estimate of position error by summing up and integrating the velocity errors (in BEMF units). A constant command roughly translates to a linearly increasing measured back electromagnetic field. In various embodiments, the controller 404 may be a proportional-integral (PI) controller, such that the integral effectively builds a model of position error. With such a controller 404, it is decided how much corrective action to apply to the actuator 26, and a command for the corrective action is provided by issuing an actuator command from the controller 404.

Figure 5:
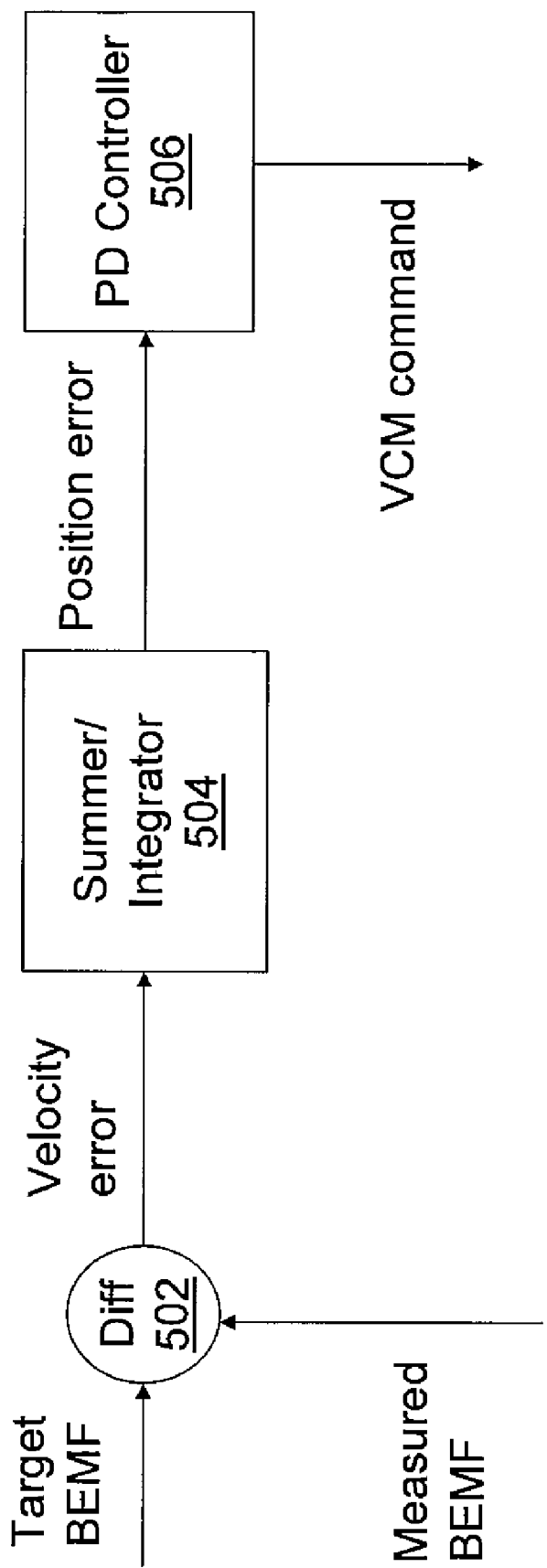
FIG. 5 illustrates a control loop for updating velocity according to an embodiment of the present invention.

Referring to FIGS. 1 and 5, in various other embodiments, a control loop provided by the control electronics 28 is configured as follows. A reference or target back electromagnetic field value and a measured back electromagnetic field value are input into a difference calculator 502. The difference calculator 502 is configured to calculate a velocity error, and inputs the velocity error into a summer/integrator 504. The summer/integrator 504 is configured to pre-integrate the velocity into a position error. The position error is input to the proportional-derivative (PD) controller 506. The PD controller 506 is configured to decide how much corrective action to apply to the actuator 26, and the PD controller 506 provides an actuator command to the actuator 26 to cause the corrective action.

A third part of embodiments of the present invention involves sending an appropriate write pattern to the head 36. Specifically, there arises an issue with a duty cycle of a preamplifier (not shown) that provides a current or voltage to the head 36. It is necessary to ensure total coverage of the erase while not exceeding duty cycle limits of the preamplifier. In various embodiments, in the case of erasing, only DC current is applied. The preamplifier sends current to the head. If the write current is constantly on, that may burn up the preamplifier and, thus, the preamplifier has thermal issues. Preamplifier duty cycles, from an erase perspective, serve to keep a temperature of the preamplifier regulated by erasing for a while, then not writing anything, and then turning the erase current back on. In various embodiments, the preamp duty cycle is controlled. In some embodiments, the preamp duty cycle is controlled by pausing a write current different amounts of time between spiral motions. Also, in some embodiments, the preamp duty cycle is controlled by segmenting a writing of the erase pattern to the disk 14 during passes. Because nominal knowledge of a radial position of the head 36 is known during seek motions, a radial segment of erase on successive seek motions can be changed. For example, the write current could be applied on a second path as the disk is out of phase 180 degrees from a first path. This would ensure total coverage of the disk in twice the time. Thus, total coverage of the erase can be ensured while not exceeding duty cycle limits on the preamplifier.

Assuming a nominal actuator Kt curve, it is possible to identify head radial position with an integrated actuator back electromagnetic field that will be utilized to determine when it is safe to pass write current through the head 36. For DC erase, the write current pattern is relatively straightforward to determine. For a given choice of seek velocity and write pattern, one can statistically describe the pattern seen by a read head passing over the surface in a given profile. For example, if the erase seeks are performed at high velocity with a phase shifted low frequency pattern, a read head moving across the disk at constant radial position will see what appears to be high frequency noise as a result of the variations during write. This perception of noise results because at any given instant, the read signal is determined by the patterns written during multiple passes of the erase process.

A fourth part of embodiments of the present invention involves analysis relating to the erasure of the disk 14. In various embodiments, analysis is performed to ensure that the disk 14 is completely erased. For this analysis, several terms are defined. RPM is the revolutions per minute of the disk 14. N is a number of launches around a revolution. R is a duration of a single erase seek in units of disk revolutions. W is a ratio of writer width to a width of an annulus to be erased. Q is a probability that a sector was not erased at a particular radius.

In various embodiments, some of the total time utilized in erasing the disk 14 is spent resting against crashstops or ramp assemblies in preparation for a launch, while establishing a position reference. Also, some of the total time utilized in erasing the disk 14 is spent over the surface of the disk 14. The time spent over the disk 14 with a write current applied to the head 36 is a predominant requirement to guarantee a statistical erase.

A minimum time to accomplish a complete erase of a surface of a storage medium by writing data with a head is to spend one revolution's worth of time at each radius of the disk. The erase time grows proportionally with a radial erase band width and inversely proportional with RPM and head width. The minimum time is exemplified in the following equation:

$$\text{Minimum time} = (\text{Total Stroke}/\text{Writer Width})/\text{RPM}$$

This would require perfect control of head position, which may not be reasonable to assume. In various embodiments, it may be reasonable to assume radial symmetry of the erase. This is reasonable because erase motions will be launched from some number of angular positions distributed evenly around a revolution of the disk 14, by use of a disk-locked clock. In various embodiments, spindle motor zero crossings are utilized to maintain the disk-locked clock. In some embodiments, it may also be reasonable to assume that the erase seeks have a nominally constant velocity profile.

In order to calculate the probability (Q) that a sector was not erased at a particular radius, the following algorithm may be utilized. Divide an annulus to be erased into N radially symmetric sectors. With a radially symmetric erase operation, it may be reasonable to assume that each time the writer passes over a sector, there is a probability (W) that it covers a particular radial portion of the disk. It may also be reasonable to assume that there is a random variation in a position of the head during an erase seek. Therefore, the probability Q that a sector was not erased at a particular radius would be:

i $Q = (1-W)^{(2*N*R)}$

In various embodiments, instead of allowing the suspension 30 or actuator arm assembly 20 to rest against crashstops or ramp assemblies for launch, the actuator arm assembly 20 could bounce off a ramp assembly to make the determination of a start of a seek motion more efficient. Also, in various embodiments, the seek motions could be performed without the back electromagnetic field feedback control. Instead, an iteratively updated open loop control could be utilized. This open loop control could also successfully determine repeatable seek motions across the stroke such that the write current can be turned on and off appropriately to erase the disk 14 and avoid damage to the head 36.

Various embodiments of the present invention only require a firmware modification to existing disk drives. Also, various embodiments of the present invention utilize actuator back electromagnetic field and spindle motor zero crossings. The actuator back electromagnetic field may be utilized for crashstop or ramp assembly detection and for control of seeks across a stroke. The spindle motor zero crossings may be utilized to maintain a disk-locked clock. In various embodiments, a combination of those two technologies allows a controlled coverage of an erase operation over the surface of the disk 14 without a need for external sensors.

Various embodiments of the present invention allow for magnetically erasing a disk surface during a manufacturing process, so as to uniformly magnetize the surface of the disk in a DC erase operation. Also, various embodiments of the present invention allow for magnetically erasing a disk surface that has undesirable magnetization.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A method comprising:
controlling an actuator to seek a head across a surface of a disk systematically in plurality of passes based on feedback signal measurements and disk phase; and
providing an erase write pattern to the head for each of the plurality of passes of the head across the surface of the disk by segmenting a writing of the erase pattern to the disk during a single pass, such that a duty cycle of a preamplifier that provides current to the head remains less than a specified maximum duty cycle.

2. The method of claim 1, wherein adjacent ones of the plurality of passes overlap each other.

3. The method of claim 1, wherein a contact of an actuator arm with a mechanical stop at an end of a pass of the plurality of passes is detected using a measured back electromagnetic field signal of the actuator.

4. The method of claim 1, further comprising:
performing repetitive seeks of the head across a stroke between mechanical stops.

5. The method of claim 1, wherein the head is launched over the surface of the disk at a specified disk phase.

6. The method of claim 5, wherein an angular spacing of launch points for the head is a design variable.

7. The method of claim 5, wherein zero crossings of a spindle motor are utilized to obtain spiral launch points for launching the head over the disk.

8. The method of claim 7, wherein a disk locked clock is utilized to obtain launch points on the disk at which the head is launched over the disk.

9. The method of claim 1,
wherein a position error is obtained from a difference between the feedback signal measurements and reference feedback signal values; and wherein the actuator is controlled based on the position error.

10. An apparatus, comprising:
a first controller for controlling an actuator to seek a head across a surface of a disk systematically in a plurality of passes based on feedback signal measurements and disk phase; and
a second controller for providing an erase write pattern to the head for each of the plurality of passes of the head across the surface of the disk,
wherein the second controller is configured to segment a writing of the erase pattern to the disk during a single pass of the plurality of passes, such that a duty cycle of a preamplifier that provides current to the head remains less than a specified maximum duty cycle.

11. The apparatus of claim 10, wherein the first controller is configured to control the actuator while the disk is spinning such that adjacent ones of the plurality of passes partially overlap each other.

12. The apparatus of claim 10, wherein the first controller is configured to detect a contact of an actuator aim with a mechanical stop at an end of a pass of the plurality of passes using a measured back electromagnetic field signal of the actuator.

13. The apparatus of claim 10,
wherein the first controller is configured to perform repetitive seeks of the head across a stroke between mechanical stops during an erasure operation.

14. The apparatus of claim 10, wherein the first controller is configured to control the actuator so as to launch the head over the surface of the disk at a specified disk phase during an erasure operation.

15. The apparatus of claim 14, wherein the first controller is configured to utilize zero crossings of a spindle motor to obtain spiral launch points for launching the head over the disk.

16. The apparatus of claim 14, wherein the first controller is configured to utilize a disk locked clock to obtain launch points on the disk at which the head is launched over the disk.

17. The apparatus of claim 10,
wherein the first controller is configured to obtain a position error from a difference between the feedback signal measurements and reference feedback signal values; and
wherein the first controller is configured to control the actuator based on the position error during an erasure operation.

18. A method, comprising:
determining a substantially repeatable seek motion of a head from an inner diameter of a disk to an outer diameter of the disk;
determining a launch point at which the head is launched over the disk based on disk phase;
launching the head at the launch point in the seek motion from the inner diameter of the disk to the outer diameter of the disk; and
selectively turning on and off a write current to the head during the seek motion to erase at least a portion of the disk and such that a duty cycle of a preamplifier that provides current to the head remains less than a specified maximum duty cycle.

19. The method of claim 18, wherein said determining the substantially repeatable seek motion of the head from the inner diameter of the disk to the outer diameter of the disk, comprises:
determining the substantially repeatable seek motion of the head from the inner diameter of the disk to the outer diameter of the disk based on back electromagnetic field measurements from an actuator that moves the head.

20. The method of claim 18, comprising:
determining the disk phase based on zero crossings of a spindle motor that spins the disk.

* * * * *